United States Patent [19]
Lecoeur

[11] 3,719,417
[45] March 6, 1973

[54] DETACHABLE FILM MAGAZINE FOR MOTION PICTURE CAMERA

[75] Inventor: Jacques Lecoeur, Paris, France

[73] Assignee: Eclair International, Paris, France

[22] Filed: Aug. 5, 1971

[21] Appl. No.: 169,258

[30] Foreign Application Priority Data

Feb. 8, 1971 France..................7104076

[52] U.S. Cl................352/78 R, 352/156, 242/194
[51] Int. Cl..................................G0b3 23/00
[58] Field of Search ...352/72, 78, 156; 242/193, 194

[56] References Cited

UNITED STATES PATENTS

| | | | |
|---|---|---|---|
| 2,476,705 | 7/1949 | Coutant et al. | 352/78 R |
| 3,208,685 | 9/1965 | Edwards et al. | 352/156 X |
| 3,561,851 | 2/1971 | Martin | 242/194 X |
| 1,303,543 | 5/1919 | Vry | 352/156 |
| 3,484,056 | 12/1969 | Sugino et al. | 352/18 R |
| 3,499,617 | 3/1970 | Winkler | 242/194 |
| 3,475,089 | 10/1969 | Funck | 352/78 R |
| 3,539,130 | 11/1970 | Winkler | 242/194 |

*Primary Examiner*—Samuel S. Matthews
*Assistant Examiner*—Alan A. Mathews
*Attorney*—Irving M. Weiner

[57] ABSTRACT

This invention relates to a detachable film magazine for motion picture camera. This magazine consists essentially of a flat box having detachable major faces. An intermediate partition parallel to said faces divides the box into a first compartment and a second compartment. The first compartment encloses the feed spool and means for guiding the film towards a slot formed in said intermediate partition for transferring the film to the second compartment. This second compartment encloses a drive sprocket actuated from the camera motor, a take-up spool and means for guiding the film emerging from said transfer slot along a first peripheral zone of said sprocket, then along the outer face of the front wall of the magazine, which is adapted to be locked to the rear face of the camera, and finally along a second zone of said sprocket towards the take-up spool.

3 Claims, 7 Drawing Figures

PATENTED MAR 6 1973 3,719,417
SHEET 1 OF 2
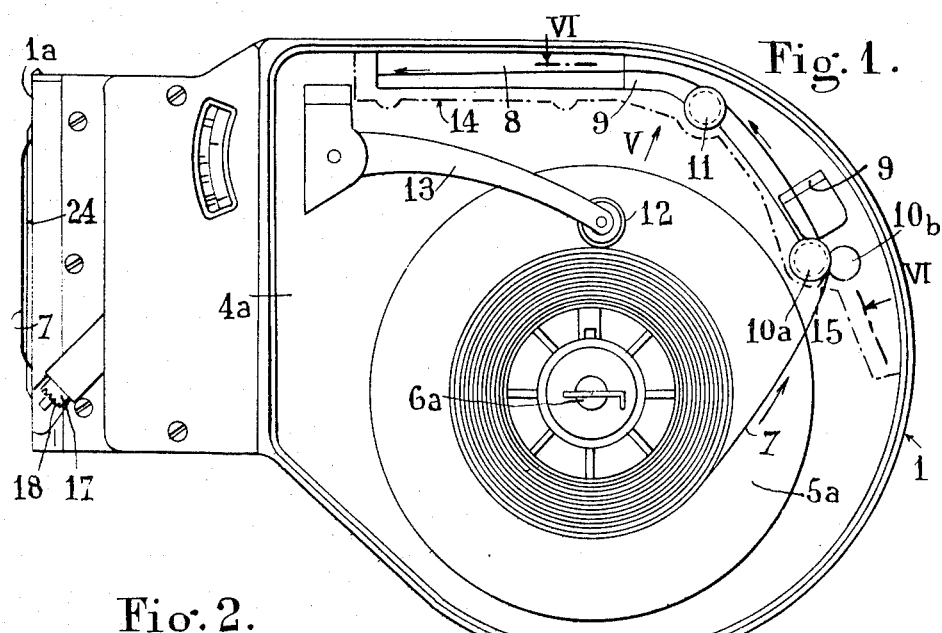
Fig. 1.
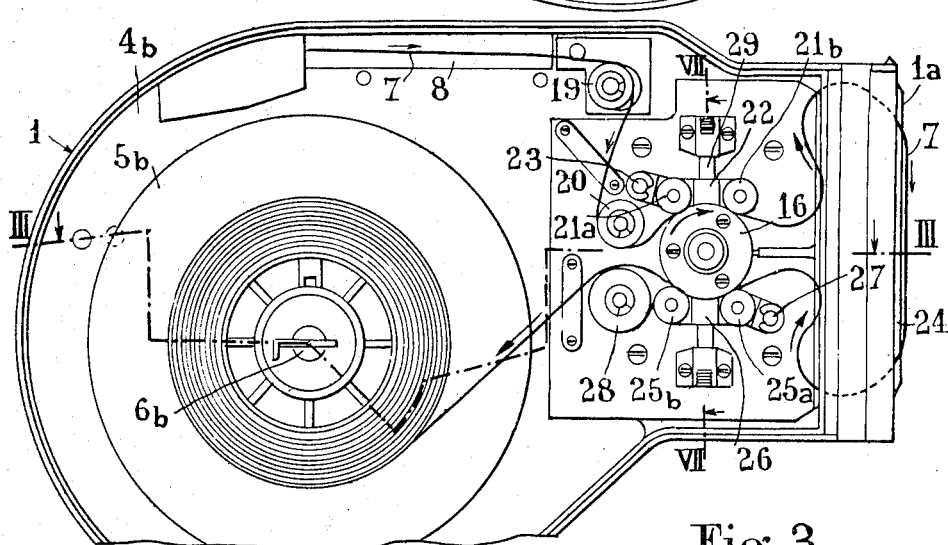
Fig. 2.
Fig. 3.
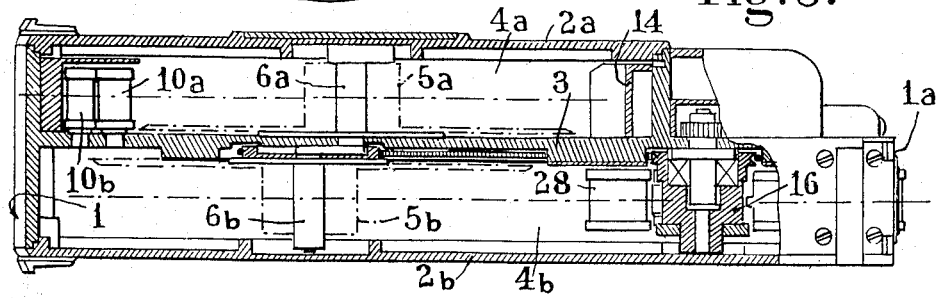
INVENTOR
JACQUES LECOEUR
BY Irving M. Weiner
ATTORNEY

PATENTED MAR 6 1973 3,719,417

DETACHABLE FILM MAGAZINE FOR MOTION PICTURE CAMERA

BACKGROUND OF THE INVENTION

The present invention relates to detachable film magazines, also called box-magazines, for motion picture cameras.

Detachable film magazines of this character are already known. They comprise essentially a relatively flat box or case divided by a median partition parallel to its major faces into two compartments to which access can be had by removing at least partially said major faces, said compartments receiving the feed spool and take-up spool respectively, preferably in coaxial relationship, means being also provided in these two compartments for guiding the film and feeding same from the camera motor along a path extending from the feed spool along the front face of the magazine and externally thereof to the take-up spool, said front face being adapted to be locked against the rear face of the camera which comprises the film gate.

Most detachable film magazines for motion picture cameras which pertain to the type broadly described hereinabove comprise relatively elaborate means for guiding and feeding the film, these means being provided in duplicate, that is, one set of means in the feed spool compartment and another set in the take-up spool compartment. It is therefore clear that these film magazines are not only of complicated design and construction, but also expensive to manufacture, delicate to operate and inasmuch noisy in operation as they comprise a greater number of guiding and driving members.

SUMMARY OF THE INVENTION

The detachable film magazine for motion picture camera according to this invention is of the known type mentioned in the foregoing but it departs therefrom by the simplicity of the film guiding and driving or feeding means provided therein.

The detachable film magazine according to this invention is characterized in that the feed spool compartment further comprises only one device for guiding the film towards a slot formed in the intermediate partition for transferring the film from one compartment to another, and that the take-up spool compartment further comprises a single driving drum actuated from the camera motor, as well as means for guiding the film emerging from the transfer slot formed in the intermediate partition, along a path extending along a first zone contained in a limited sector of the periphery of said driving drum, then through the outlet slot provided for delivering the film from the magazine, subsequently through the slot provided for re-introducing the film into the magazine, and eventually another zone also contained in a limited sector of the periphery of the same driving drum, before the take-up spool, said other zone having the same direction of rotation as said first zone.

Under these conditions, in the film magazine according to this invention the film is driven only in the take-up spool compartment, and the film feed spool compartment comprises only a guide means which may be of extremely simple design. Due to its constructional simplicity, the detachable magazine according to the present invention is more economical and less fragile than hitherto known detachable magazines of the same type. Its operation is more noiseless due to the reduction in the total number of guiding and driving members. For the same reason, recharging this magazine constitutes an easier and therefore faster operation.

BRIEF DESCRIPTION OF THE DRAWINGS

A typical form of embodiment of this invention will now be described by way of example with reference to the attached drawings. In the drawings:

FIGS. 1 and 2 are side elevational views showing the two major faces of the detachable film magazine, from which the outer cover plates have been removed to show the interior;

FIG. 3 is a cross section taken along the broken line III—III of FIG. 2, with the cover plates fitted against the major faces of the magazine;

DESCRIPTION OF THE PREFERRED EMBODIMENT

Figure 6:
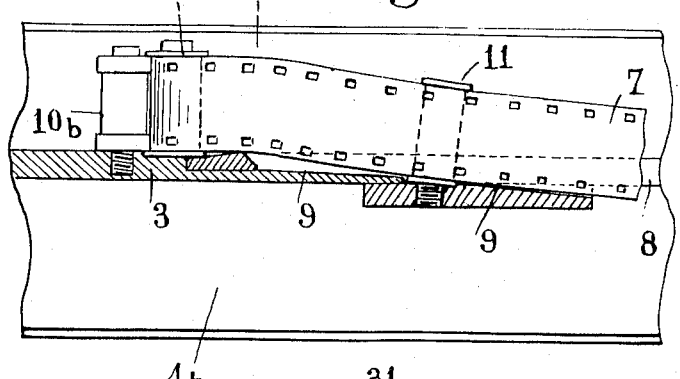
FIGS. 6 and 7 are sections taken along the lines VI—VI and VII—VII of FIGS. 1 and 2, respectively.

As illustrated in FIGS. 1 to 3 of the drawings, the typical form of embodiment of the detachable film magazine according to this invention which is illustrated therein comprises essentially a flat box or case 1 consisting preferably of light alloy. The two major faces of this box, as shown more particularly in FIGS. 1 and 2, are open through most of their surface but adapted to be closed by detachable cover plates shown in section in FIG. 3, and denoted 2a and 2b, respectively. As clearly shown in this FIG. 3 the flat box magazine 1 is divided by an intermediate or central partition 3 parallel to said major faces into a first compartment and a second compartment designated by the reference symbols 4a and 4b respectively, to which access may be had by removing the cover plates 2a and 2b. In these compartments 4a and 4b the feed spool 5a and take-up spool 5b are housed, respectively, so as to be substantially coaxial to each other (FIG. 3 shows clearly that the center pins 6a and 6b of these spools, shown in dash and dot lines at 5a and 5b respectively, are slightly offset from each other). According to the present invention the compartment 4a receiving the feed spool 5a comprises in addition thereto only a device for guiding the film 7 towards a slot 8 formed in the intermediate partition 3 for transferring the film 7 from compartment 4a to compartment 4b, as shown in FIG. 6. In the typical form of embodiment contemplated herein this film guiding device comprises firstly an inclined ramp 9 made of several sections and extending from the face of partition 3 registering with compartment 4a down to compartment 4b, as shown in FIG. 6, at the level of the portion of transfer slot 8 nearest to the feed spool 5a, as shown in FIG. 1. A pair of guide rollers 10a, 10b are disposed at the inlet end of inclined ramp 9, and a single guide roller 11 is disposed slightly before the lower end of said guide ramp 9. Upstream of the inlet end of said inclined ramp 9, where the pair of guide rolls 10a, 10b are disposed, a detachable presser roller 12 carried by the end of pivoted arm 13 is urged by spring means (not shown) against the outermost turn of film 7 wound on the feed spool 5a and adapted to display on a counter dial (shown in the upper left-hand portion of FIG. 1 the still unexposed film length.

Figure 4:
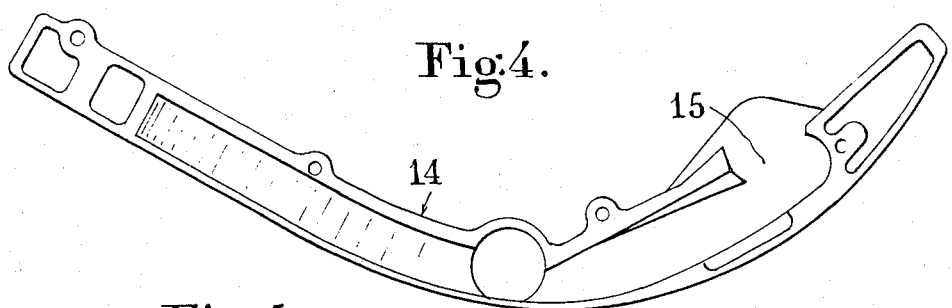
FIGS. 4 and 5 are a plane view from beneath and an elevational view, respectively, as seen in the direction of the arrow V of FIG. 1, of a closed cover member of which the function will be explained presently.
Figure 5:
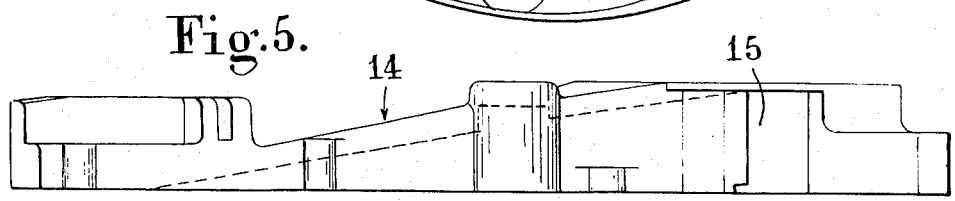

FIGS. 4 and 5 illustrate separately in plan view from beneath and in elevational view, respectively, a closed cover 14 of moulded material, preferably plastic or other synthetic material, of a shape matching that of the aforesaid inclined ramp 9 of the film guiding device. This cover 14 comprises an inlet slot 15 for the film 7 and is fitted in compartment 4a by being secured, for example by means of screws, to the intermediate partition 3, so as to enclose the inclined ramp 9, its film guiding rollers 10a, 10b and 11, as well as the film transfer slot 8. In FIG. 1, the contour of this cover 14 is shown in dash and dot lines in its service or operative position. It will be seen that the film 7 delivered by the feed spool 5a beyond the presser roller 12 penetrates into the closed cover 14 through the slot 15 thereof, then moves through the nip of the pair of guide rollers 10a and 10b, towards the transfer slot 8 via ramp 9 and guide roller 11, as clearly shown in FIGS. 1 and 6.

Figure 7:
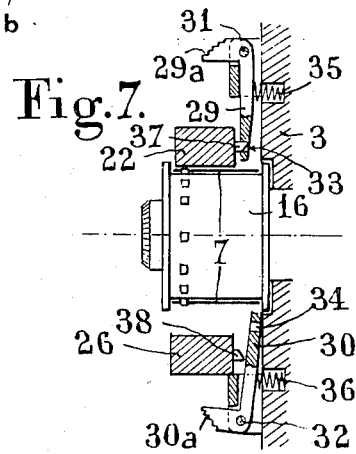

FIG. 2 shows that the other compartment 4b receiving the take-up spool 5b further comprises a single drive sprocket 16 mounted with its shaft perpendicular to the intermediate partition 3 in the portion of compartment 4b extending between the take-up spool 5b and the end of magazine box 1 comprising the front face 1a to be locked in a manner known per se against the rear face of the camera (not shown) by means of a suitable and known mechanism (not shown) disposed within the intermediate partition 3; the description of this mechanism is therefore not necessary for the proper understanding of this invention. This mechanism is driven from the camera motor (not shown) through a transmission shaft 17 provided at its outer end with an automatic coupling member 18, according to the known system, so as to automatically and drivingly engage the matching end of the camera motor shaft when the film magazine is locked to the rear face of the camera. This motor shaft also emerges from the rear face of the camera and is provided likewise with an automatic coupling member complementary to said coupling member 18. The film magazine compartment 4b further encloses the following means for guiding the film issuing from the transfer slot 8 of intermediate partition 3 to the take-up spool 5b along a suitable path:

A first pair of rollers 19, 20 guide the film 7 emerging from the transfer slot 8 towards a first zone, or angular sector, of the periphery of drive sprocket 16, the film 7 being pressed against this sector by a first pressure device comprising in the example illustrated a pair of presser rollers 21a, 21b adapted to press the film 7 against the peripheral surface of sprocket 16 at the inlet and outlet ends of said angular sector or first zone. In the example illustrated the rollers 21a, 21b are mounted for free rotation on an arm 22 pivoted in turn about a pin 23 secured to the intermediate partition 3 and in parallel relationship to the axis of drive sprocket 16. Beyond the presser roller 21b the film 7 emerges through a suitable slot from the front face 1a of the magazine, whereafter it moves past a zone equipped in the manner known per se with a flat pressure member 24 adapted to hold the film in the gate provided in the rear face of the camera. Beyond this pressure member 24 the film 7 is re-introduced into the magazine through a corresponding slot and then urged against another zone or angular sector of the periphery of guide sprocket 16 by another pressure device 25a, 25b, 26, 27 of same type as the pressure device associated with the first zone of guide sprocket 16. In the form of embodiment illustrated the two peripheral zones of sprocket 16, against which the film is pressed, are diametrally opposite, but this arrangement is not compulsory; however, it is necessary that these two zones correspond to the direction of rotation, as in the case illustrated in FIG. 2, the rollers 21b and 25a corresponding to the inlets of the two zones or sectors along which the film is pressed against the sprocket 16, respectively, the other rollers 21a and 25b corresponding to the outlets of said zones ro sectors. Beyond this second pressure device the film 7 passes over a roller 28 before being eventually wound on the take-up spool 5b. In the form of embodiment of the pair of pressure devices illustrated in FIGS. 2 and 7 spring means (not shown) normally urge the pivoting arms 22 and 26 away from the sprocket 16 (position of lower arm 26 in FIG. 7, to permit an easy threading of the film 7 between the corresponding pressure rollers and the drive sprocket 16). On the other hand, beneath each pivoted arm 22 and 26 a second lever 29 or 30 is disposed substantially at right angles to said arms and adapted to pivot about a pin 31 or 32 parallel to the intermediate partition 3 and provided at its end nearest to the drive sprocket 16 with an orifice 33, 34 adapted, with the assistance of a spring 35 or 36 urging the lever 29 or 30 towards the arm 22 or 26, to lock the latter when it is pushed manually against the drive sprocket 16 (this position being illustrated in the case of the upper arm 22) by engaging a stud 37 or 38 rigid with the face of arm 22 or 26 adjacent to the intermediate partition 3. It is thus clear that to release the arm 22 of the corresponding pressure device it is only necessary for the user to depress the end 29a of lever 29, thus causing the automatic outward movement of this arm (caused by a spring, not shown) and thus permit the easy insertion of the film lead.

The above-described detachable film magazine for motion picture camera can be embodied in many different ways, as will readily occur to those skilled in the art, without departing from the basic principles of the invention. Thus, inter alia, many modifications and variations may be brought to the device for guiding the film from the feed spool to the transfer slot (directing the film to the other compartment) and this also applies to the film guide, drive and pressing devices and means which are housed in the take-up spool compartment; similarly, many modifications may be brought to the drive sprocket and to the pressure devices associated therewith, without departing from the scope of the invention as set forth in the appended claims.

What I claim is:

1. A detachable film magazine for motion picture cameras, which comprises a flat box having two major lateral faces provided with detachable cover plates, an intermediate partition in said box parallel to said major faces which divides the inner space of said box into a first compartment and a second compartment, a feed spool and a take-up spool rotatably mounted in said first and second compartments, respectively, a device in said first compartment for guiding the film towards a slot formed in said intermediate partition and transferring the film from said first compartment to said second compartment, a drive sprocket disposed in said second compartment actuated from the camera motor, means which guides the film emerging from said transfer slot of said intermediate partition and causes said film to engage a first angular sector-shaped zone of the periphery of said drive sprocket, to subsequently emerge through a first slot from the front face of said box adapted to be locked against the rear face of the camera, then to return into said box through another slot formed in said front face, and finally to subsequently engage a second angular sector-shaped zone of the periphery of said drive sprocket, said second peripheral zone having the same direction of rotation as said first peripheral zone.

2. Detachable film magazine as set forth in claim 1, wherein said device for guiding the film towards the transfer slot comprises an inclined ramp extending from the face of said intermediate partition disposed on the side of said first compartment down to the second compartment, at the level of the portion of said transfer slot which is nearest to said feed spool and, guide rollers being disposed at least at the inlet end of said inclined ramp.

3. Detachable film magazine as set forth in claim 2, wherein a closed cover of molded material, formed with a film inlet slot, is secured to said intermediate partition in said first compartment so as to cover said inclined ramp, guide rollers and film transfer slot.

* * * * *